June 30, 1964 P. D. GRAHAM 3,138,876
PRECISION PART IDENTIFYING APPARATUS
Filed Sept. 9, 1960 2 Sheets-Sheet 1
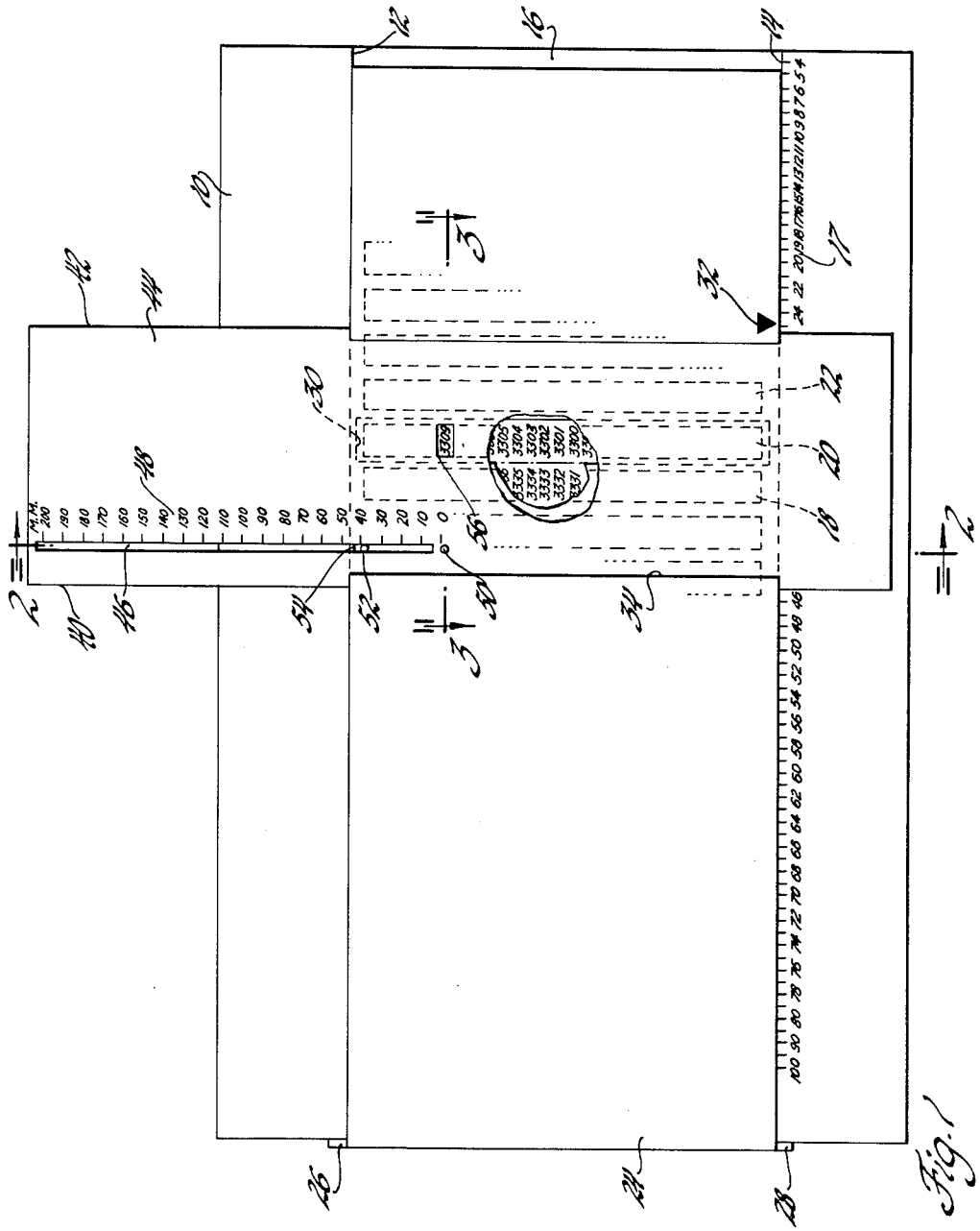
INVENTOR.
Paul D. Graham
BY
C. P. Barnard
ATTORNEY

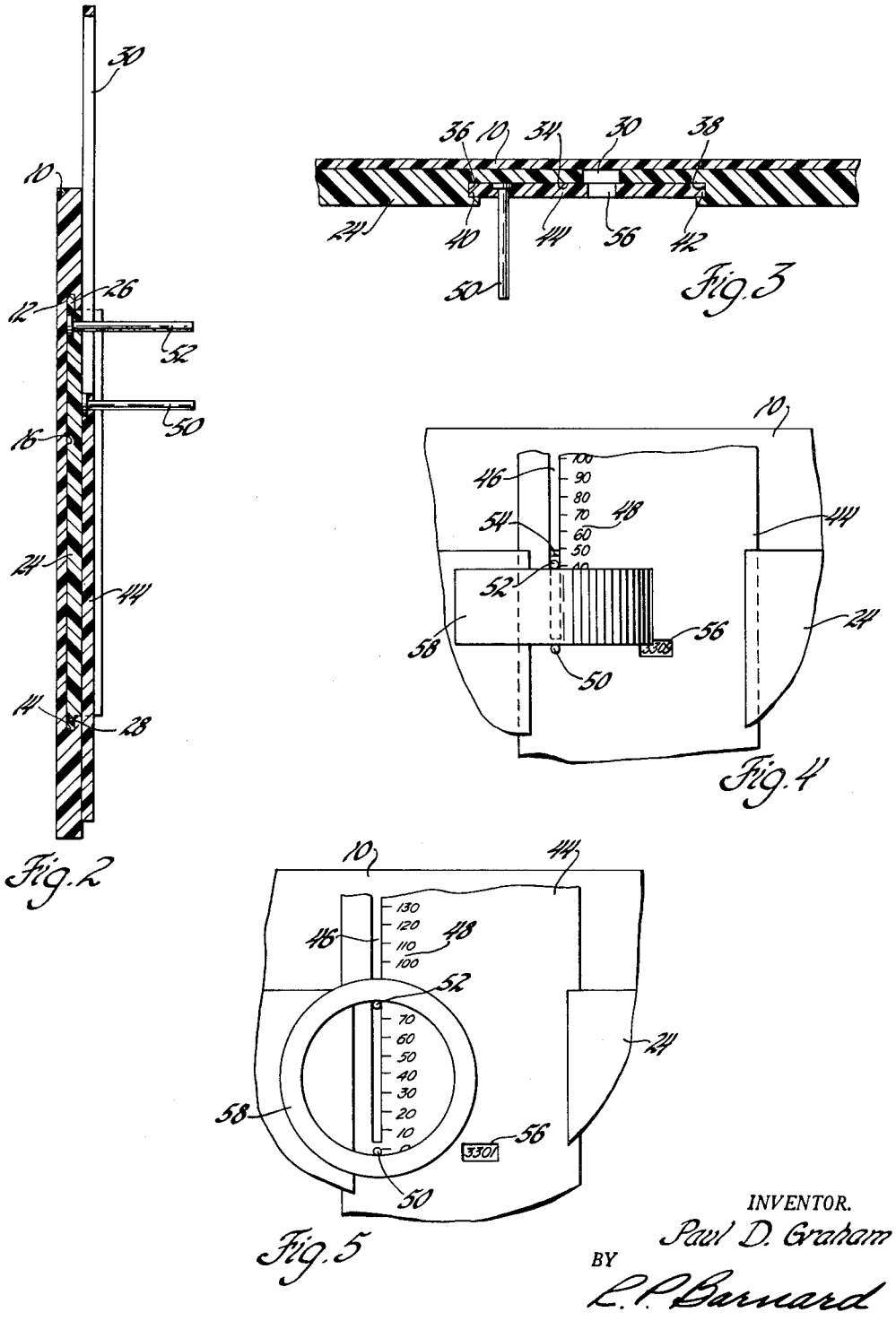

3,138,876
PRECISION PART IDENTIFYING APPARATUS
Paul D. Graham, Birmingham, Mich., assignor to General Motors Corporation, Detroit, Mich., a corporation of Delaware
Filed Sept. 9, 1960, Ser. No. 54,982
4 Claims. (Cl. 33—143)

This invention relates to apparatus for identifying precision parts and more particularly to apparatus for identifying bearing members according to a particular set of reference designations.

Precision parts such as bearings are used in great numbers in a wide variety of applications. When precision parts wear out and require replacement it is often difficult to identify the part by the original reference designation. Such difficulties may occur because some of the parts have no reference designations thereon and also because it is often impossible to read a particular reference designation provided on a part that has been subjected to extreme wear. Consequently, in order to replace precision parts which are not readily identifiable, a micrometer or other measuring device is used to determine the basic dimensions of the part such as width, depth, and length or diameter; and then by referral to a catalog or other source, a corresponding part designation is obtained from the basic dimensions. Such a procedure is time consuming and inconvenient. In some cases it is almost impossible to identify a particular part in the aforementioned method due to extreme wear of the part. Furthermore, when it is desired to obtain a replacement part having a reference designation which refers to an obsolete part or to another manufacturer's product line, it is again necessary to take measurements from the old part and try and correlate the measurements with the presently available parts to determine if there is a corresponding part available.

An object of this invention is to provide apparatus for quickly and conveniently determining an original or corresponding manufacturer's reference designation for a precision part which is to be replaced. Another object of this invention is to provide apparatus for quickly and efficiently identifying an otherwise unidentifiable precision part. Still another object of this invention is to provide part identifying apparatus which is simple enough to operate so that relatively unskilled clerks or the like may readily determine proper replacement parts.

Other objects and advantages of this invention are disclosed in the following detailed description wherein reference is made to the accompanying drawing in which:

FIGURE 1 is a plan view of an illustrative embodiment of the present invention;

FIGURE 2 is a cross-sectional view taken along the line 2—2 in FIGURE 1;

FIGURE 3 is a partial sectional view taken along the line 3—3 in FIGURE 1;

FIGURE 4 is a partial view of the apparatus shown in FIGURE 1 with a part in place thereon for measurement and identification; and FIGURE 5 is another partial view of the apparatus shown in FIGURE 1 with a part in another position thereon for measurement and identification.

Referring now to FIGURES 1, 2 and 3, the device comprises a base member 10 having a guideway formed centrally thereof by grooves 12, 14 and a slide surface 16. A scale 17 is provided along one edge of the guideway. A plurality of columns of indicia 18, 20, 22 is provided along the slide surface 16 and comprises reference designations of different sizes of a particular type precision part manufactured by a particular manufacturer. The reference designations are placed in a predetermined relationship for a purpose to be hereinafter described.

An elongated base or lower slide member 24 is supported within the grooves 12, 14 on the base member 10 by outwardly extending tongue members 26, 28. The base slide 24 is provided with a transverse slot or aperture 30 which is dimensioned to reveal individual columns of the plurality of columns of reference designations 18, 20, 22 arranged according to a first part dimension. A locating mark 32 is provided on the base slide 24 adjacent the scale 17 so that the base slide may be moved in a predetermined manner relative to the columns of indicia 18, 20, 22.

A transverse guideway 34 having grooves 36, 38 is provided on the base slide 24 and receives tongue portions 40, 42 of a cross slide 44. A longitudinal extending slot 46 is provided in the cross slide 44 and a scale 48 is provided along a side surface thereof. First measuring means comprising a pin member 50 is secured to the cross slide 44 adjacent one end of the slot 46. The zero designation of the scale starts at the pin 50 and extends therefrom along the slot 46. Second measuring means comprising a pin 52 is fixed to the base slide 24 and extends upwardly therefrom through the slot 46 of the cross slide 44. An indicia pointer 54 may be provided on the base slide 24 adjacent the pin 52 to provide a convenient means of reading the scale 48. The distance between the measuring device or pins 50, 52 is variable by sliding movement of the cross slide 44 relative to the base slide 24. A window 56 is provided in the cross slide in alignment with the slot 30 so that a particular reference designation of a particular column of the reference indicia columns 18, 20, 22 will be revealed therethrough as the base slide 24 and the cross slide 44 are positioned. The individual reference designations being arranged in each column according to a second part dimension.

In operation, the identity of a corresponding part designation for a precision part which is to be identified, such as a bearing 58 as illustrated in FIGURES 4 and 5, may be determined in the following manner: The bearing 58 is placed on edge between the pins 50, 52 and a reading on the scale 48 is obtained. The reading on the scale 48 is used to position the base slide 24 by moving the pointer 32 to a position relative to the scale 17 which corresponds with the reading taken from the scale 48. Movement of the base slide 24 in this manner positions the slot 30 over a particular column of reference designations such as the column 20 as shown in FIGURE 1. Then the pins 50, 52 are used to obtain another measurement of the particular part 58 and position the cross slide 44 relative to the base slide 24. As shown in FIGURE 5, the inside diameter or bore of the part 58 may be used as the second reference dimension and the part 58 may be placed over the pins 50, 52 and in peripheral engagement therewith as shown. The window 56 is thereby positioned relative to the previously selected column of the columns of reference designations so that a particular reference designation will appear in the window. The reference designations are permanently positioned on the upper surface of the base 10 in a predetermined relationship according to dimensional characteristics so that the manufacturer's reference designation for a part having dimensional characteristics similar to the tested part will appear in the window 56. According, the position of the reference designations on the base 10 is determined by the particular dimensional characteristics of width, length or diameter which are to be used so that when the base slide 24 and the cross slide 44 have been positioned in accordance with such dimensions, the particular manufacturer's reference designation will appear in the window. It will be seen, therefore, that the reference designations may be arranged in a manner different than that illustrated. The device may be made of any suitable material such as plastic or metal or the like.

It is understood that other changes in the details of

I claim:

1. A precision part identifying apparatus adapted to identify parts according to the manufacturer's reference designations where said parts are classified according to overall dimensions of width, depth, and length or diameter, said apparatus comprising a base having said reference designations arranged in a plurality of columns thereon according to a first part dimension and arranged individually within each of said columns according to a second part dimension, a first slide means having an aperture therein and being slidable on said base and positionable relative to said columns according to said first part dimension, said aperture arranged coterminously with one of said columns when said first slide means is so positioned, a first part dimension scale on said base with respect to which said first slide means is positioned, pointer means on said first slide means for locating said position, a second slide means operatively connected to said first slide means for movement therewith and being slidable relative thereto, said second slide means having a window therein, said window being aligned with said aperture and cooperating therewith to expose individual reference designations therethrough, first measuring means on said second slide means, and second measuring means on said first slide means cooperating with said first measuring means to automatically position said second slide means when it is moved relative to said first slide means to cause relative displacement between said measuring means according to the second part dimension relative to said first slide means whereby a particular reference designation corresponding to said part is visible in said window.

2. The device as described in claim 1 wherein said second measuring means is fixed to said first slide means and extends upwardly therefrom, a slot provided in said second slide means and receiving said second measuring means therein, said first measuring means being fixed to said second slide means and being movable therewith and measuring means aligned with said slot whereby said measuring means cooperate for determining said second part dimension and automatically position said second slide means relative to said first slide means so that a particular reference designation corresponding to said part is visible in said window.

3. The device as described in claim 2 wherein said first and second measuring means comprise pin means adapted to receive therebetween said part thereby determining said second part dimension and automatically positioning said second slide means relative to said first slide means whereby a particular reference designation corresponding to said part is visible in said window.

4. A precision part identifying apparatus adapted to identify parts according to the manufacturer's reference designations where said parts are classified according to overall dimensions of width, depth, and length or diameter, said apparatus comprising a base having said reference designations transversely arranged in a plurality of columns thereon according to said first part dimension and arranged individually within each of said columns according to a second part dimension, said base having a scale along one longitudinal edge thereof corresponding to said first part dimension, a first slide means being longitudinally slidable on said base relative to said columns and said scale and having a laterally extending slot therein, said slot arranged to be conterminous with one of said columns when said first slide means is positioned on said scale according to said first part dimension, pointer means on said first slide means for locating said position with respect to said scale, a second slide means operatively connected to said first slide means for movement therewith and being transversely slidable relative thereto, said second slide means having a window therein aligned with said slot and adapted for cooperation therewith to expose individual reference designations therethrough, measuring means fixed to said first slide means and extending upwardly therefrom, a slot provided in said second slide means and receiving said measuring means therein, other measuring means fixed to said second slide means and being movable therewith and being aligned with said slot whereby said measuring means cooperate for determining said second part dimension and simultaneously position said second slide means relative to said first slide means so that a particular reference designation corresponding to said part is visible in said window.

References Cited in the file of this patent

UNITED STATES PATENTS

| | | |
|---|---|---|
| 412,631 | Kraehmer | Oct. 8, 1889 |
| 1,200,569 | Young | Oct. 10, 1916 |
| 1,419,004 | Allen | June 6, 1922 |
| 1,495,435 | Pike | May 27, 1924 |
| 1,888,416 | Williams | Nov. 22, 1932 |

UNITED STATES PATENT OFFICE
CERTIFICATE OF CORRECTION

Patent No. 3,138,876  June 30, 1964

Paul D. Graham

It is hereby certified that error appears in the above numbered patent requiring correction and that the said Letters Patent should read as corrected below.

Column 2, line 61, for "According" read -- Accordingly -- column 3, line 41, strike out "measuring means"

Signed and sealed this 17th day of November 1964.

(SEAL)
Attest:

ERNEST W. SWIDER
Attesting Officer

EDWARD J. BRENNER
Commissioner of Patents